3,366,451
Patented Jan. 30, 1968

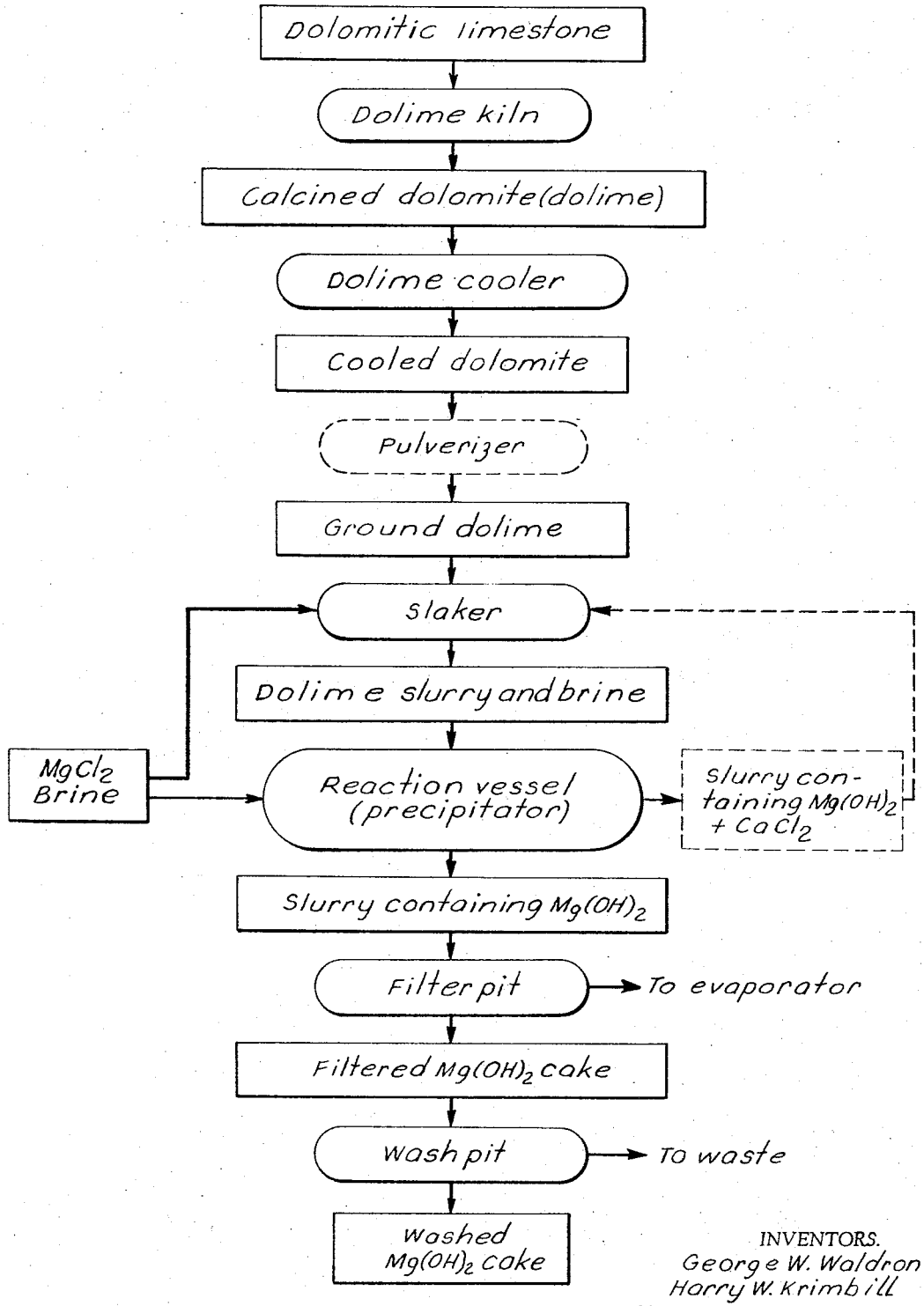

3,366,451
PRODUCTION OF MAGNESIUM HYDROXIDE
George W. Waldron, Jr., Bay City, and Harry W. Krimbill, Midland, Mich., assignors to The Dow Chemical Company, Midland, Mich., a corporation of Delaware
Continuation-in-part of application Ser. No. 412,166, Nov. 18, 1964. This application Jan. 4, 1967, Ser. No. 613,708
2 Claims. (Cl. 23—201)

ABSTRACT OF THE DISCLOSURE

This specification discloses an improved process for making a magnesium hydroxide product, characterized by a high surface area and small particle size from brines containing, for example, $MgCl_2$ and lime-containing materials such as dolomite. The process constitutes an improvement to U.S. Patent 3,080,215 and essentially comprises adding to calcined dolomite (dolime) in a slaking apparatus from about 1.5 to about 80 weight percent, normally 10 to 80 percent, and preferably from about 15 to about 50 weight percent of a magnesium halide-containing brine, along with an aqueous calcium chloride slaking mixture, at a temperature in the slaker of from about 40 to about 90° C., the proportion of brine added to the slaker being directly related to the specific gravity of the slaking liquid within a range of from about 1.07 to about 1.3. The residence time in the slaker is from about 4 minutes to about 3 hours. The resulting dolime slurry is then added to a reaction vessel such as a precipitator along with the remainder of the fresh $MgCl_2$-containing brine solution, whereby the balance of magnesium values are precipitated as $Mg(OH)_2$ employing a slight stoichiometric excess of $Ca(OH)_2$ precipitant.

CROSS REFERENCE TO RELATED CASES

This application is a continuation-in-part of copending application Ser. No. 412,166, filed Nov. 18, 1964, now abandoned.

BACKGROUND OF THE INVENTION

A process for making a magnesium hydroxide product employing dolomite and a $MgCl_2$-containing brine to produce a dense magnesium hydroxide filter cake, containing at least 45 percent $Mg(OH)_2$ and which is low in impurities, is disclosed in U.S. Patent No. 3,080,215, entitled "Production of $Mg(OH)_2$" by G. W. Waldron and J. N. Periard. This patented process produces magnesium hydroxide which is suitable for use in making most periclase-type (a sintered form of MgO) refractory products. However, it was discovered that this magnesium hydroxide was not completely suitable in all cases for use in making a high purity, high density, low porosity periclase product. The magnesium hydroxide made from said patented process has an average particle size ranging from about 5.6 to about 10 microns and a surface area ranging from about 6 to about 9 square meters per gram. After pelleting and firing the magnesium hydroxide product to about 1700° C., the resulting periclase may have a density ranging approximately from about 2.9 to about 3.0 grams per cubic centimeter (gm./cc.). During the periclase manufacturing process, the $Mg(OH)_2$ first is heated to a firing temperature of about 350° C. where it decomposes to MgO. Conventionally, to increase the density of the periclas, it has been the practice to add sintering agents, such as silica, during the sintering process at the same firing temperature. However, the use of additives is limited in some cases, since it places a lower maximum use temperature on the refractory due to the formation of flux-like compounds which have relatively low melting points in the periclas.

It is a principal object of the instant invention to provide an improvement in the aforementioned patented process which results in the formation of a magnesium hydroxide product which has a particle size within the range of from about 3 to about 5.5 microns and a surface area within the range of from about 10 to about 20 square meters per gram.

It is an additional object of the instant process to provide a magnesium hydroxide product which is suitable for use in the production of high purity, high density, low porosity periclase requiring a substantially lesser amount of sintering agents for density improvement in the periclase product than has been used in the past.

Other uses, object and advantages of the instant invention will be apparent from reading the detailed description thereof in conjunction with the accompanying figure. The appended figure is a block diagram of one embodiment of the instant improved method.

In general, the instant invention provides an improvement in the method set out in U.S. Patent No. 3,080,215 for the manufacture of a magnesium hydroxide product.

The method set out in U.S. Patent No. 3,080,215 comprises calcining dolomite at a maximum temperature of about 1450° C. to form the corresponding oxides (hereinafter referred to as dolime); slaking the oxides with a slaking liquid comprising an aqueous calcium chloride solution substantially free of magnesium ions and having a specific gravity of at least about 1.07 and preferably not over 1.30 (as measured at about 25° C.) to produce a slaked dolomitic lime slurry containing $Ca(OH)_2$, MgO and $Mg(OH)_2$ hereinafter referred to as a dolime slurry; intermixing the dolime slurry with an aqueous brine solution containing at least about 2 percent by weight $MgCl_2$ for a mixing period of at least about three hours for brines having a low $MgCl_2$ concentration (that is up to about 3.5 weight percent $MgCl_2$) at a temperature within the range of from about 40 to about 80° C. or for brines more concentrated in $MgCl_2$ for at least about two hours at the indicated temperature, thereby producing a readily filterable magnesium hydroxide suspended in a $CaCl_2$-containing brine; separating the thus suspended magnesium hydroxide from the mother liquor, as by filtration; and, water-washing the resulting magnesium hydroxide filter cake (sometimes called magnesium hydrate). The amount of the dolime slurry to be used must be sufficient to provide more than one mole of $Ca(OH)_2$ per mole of $MgCl_2$ present in the aqueous brine reactant.

The present improvement in the hereinbefore described patented process comprises adding to the slaking dolime (in a slaking apparatus) from about 1.5 to about 80 weight percent, preferably from about 10 to about 80 percent, and more preferably from about 15 to about 50 weight percent of the $MgCl_2$-containing brine (based on $$MgCl_2/Ca(OH)_2$$

required for preparation of $Mg(OH)_2$ as set forth hereinbefore) along with the aqueous calcium chloride slaking mixture. The temperature in the slaker is generally within a range of from about 40° C. to about 90° C. The slaking process is continued for a period of from about 4 minutes up to about 3 hours, and preferably from about 6 to about 30 minutes. The amount of the $MgCl_2$-containing brine to be added to the slaker is directly related to the concentration of the aqueous $CaCl_2$ solution being used for slaking. Generally, the aqueous $CaCl_2$ slaking solution used in the aforesaid patented process will have a specific gravity of at least from about 1.07 to about 1.3 (measured at 25° C.). For purposes of the present novel improvement, the specific gravity of the aqueous phase or filtrate of the slaking mixture in the slaker will be considered essentially the same as that of the aqueous $CaCl_2$ slaking solution being introduced thereinto. When the slaking fluid has a high specific gravity, such as, e.g., about 1.20, as in slaking pulverized dolime, from about 10 to about 80 percent, and preferably from about 15 to about 50 percent of the requisite amount of the magnesium chloride-containing brine is added to the slaker. At low specific gravities of from about 1.07 to about 1.15, such as when slaking unpulverized dolime, the aqueous MgCl₂ brine addition is particularly effective in a range of from about 1.5 to about 10 percent, and especially from 2 to 5 percent.

The resulting dolime slurry is then added to a precipitator vessel along with the remainder of fresh MgCl₂-containing brine solution. During the precipitation or reaction period of the final mixture, the temperature in said precipitator vessel is maintained at a temperature within the range of from about 40° C. to about 80° C. for a period of for at least about 3 hours for brines containing less than 3.5 weight percent MgCl₂ and at least about 2 hours for brines containing more than 3.5 weight percent MgCl₂.

Additions of a magnesium halide brine to the slaking apparatus together with aqueous slaking liquids of particular specific gravities when made in accordance with the present invention provides a highly desirable magnesium hydroxide product having sufficient filtering characteristics, and a significantly reduced particle size from that conventionally obtained as well as a significantly increased surface area. In general, the Mg(OH)₂ product derived from the improved method herein may be characterized by a particle size below about 5.0 to 6.0 microns and a surface area in square meters per gram exceeding about 9 to 10. When the present novel process is carried without observing the brine addition limitations and slaking liquid specific gravities corresponding thereto, filterability, particle size and surface area of the Mg(OH)₂ product are detrimentally affected. For example, brine additions of, e.g., from 10 to 80 percent as aforesaid in combination with slaking liquid specific gravities les than, e.g., about 1.15, produces a difficult filtering Mg(OH)₂, while low additions of brine, e.g., below about 10 percent, in combination with high specific gravity slaking liquids detrimentally affects the improvement otherwise obtained in particle size and surface area.

In an alternative embodiment of the instant improvement in the process disclosed in U.S. Patent No. 3,080,215, the dolime slurry prepared from dolime and an aqueous calcium chloride slaking liquid after leaving the slaker is mixed at approximate specific gravity levels, in a mixing vessel, with from about 1.5 to about 80 percent, and preferably from about 15 to about 50 percent, of the requisite amount of the magnesium containing brine while maintaining a temperature in the mixing vessel within the range of from about 40° to about 90° C. for a period within the range of from about 4 minutes to about 3 hours. The mixture of brine and dolime slurry is then added to a reaction vessel (referred to herein as a precipitator) along with the remainder of fresh MgCl₂-containing brine solution and maintained therein for a predetermined period of time. During the reaction period, the temperature in said reaction vessel is maintained at a temperature within the range of from about 40° to about 80° C. for a period of for at least about 3 hours for brines containing less than 3.5 weight percent MgCl₂ and at least about two hours for brines containing more than 3.5 weight percent MgCl₂. A slight excess of Ca(OH)₂ precipitant is maintained in the precipitator over the stoichiometric amount needed to precipitate the magnesium values.

The magnesium hydroxide product resulting from the improved method of the instant invention normally has an average particle size within the range of, e.g., from about 3 to about 5.5 microns and a desirably high surface area within the range of, e.g., from about 10 to about 20 square meters per gram. The periclase product resulting from the use of the magnesium hydroxide product of the instant improved process can have a density without additives within the range, e.g., of from about 3.05 to about 3.35 grams per cubic centimeter.

One illustrative embodiment of the present process is shown in the attached drawing. The figure also depicts a pulverizer which is used when higher specific gravity calcium chloride brine is employed, and a recycle line from the precipitator to the slaker, which is used when the precipitator slurry is employed as the slaking liquid. It is to be understood that the depicted embodiment is illustrative of a mode of practicing the invention and is not to be construed as limiting the invention thereto.

The following examples serve to further illustrate the instant invention but are not to be construed as if limiting it thereto.

Example I

Runs I and II as described hereinafter are illustrative of the practice of the invention. Additionally, a control or comparative run A made in accordance with the process of U.S. Patent No. 3,080,215, without the present improvement, is included for purposes of comparison.

A typical analysis of the dolomite employed in the runs, when ignited to oxides (dolime), had the following percentage composition: about 57.5 percent CaO, about 40.0 percent MgO and about 2.5 percent inerts.

An analysis by weight of a typical brine employed in the runs showed the following salts dissolved therein: about 18.35 percent CaCl₂, 3.3 percent MgCl₂, about 5.3 percent NaCl, about 1.5 percent KCl, and lesser amounts of other salts including those of strontium, lithium, boron and iron. Its specific gravity was 1.26.

*Run I.*—Pulverized calcined dolomite and an aqueous CaCl₂ slaking liquid plus magnesium chloride brine were continuously fed into an agitated slaking vessel. Feed rates were maintained to provide the quantities of dolime (in pounds per hour), slaking liquid (in gallons per hour) (i.e., aqueous calcium chloride and MgCl₂ brine) and the inventory times in minutes as shown in the table set out hereinafter. The resulting slaked dolime slurry was led from the slaker to a precipitator (i.e., reaction vessel). Concurrently with introduction of the dolime slurry into the precipitator, the remainder (in gallons per hour) of the magnesium chloride brine was admitted at a controlled rate to the precipitator. The rate of addition of the brine was controlled to maintain an excess of Ca(OH)₂ in the precipitator over the stoichiometric quantity required to react with the MgCl₂ in the brine. Precipitated magnesium hydroxide in suspension was formed in the precipitator leaving a substantially magnesium-free mother liquor.

The magnesium hydroxide precipitate was recovered as a cake by periodically passing the slurry into a Büchner funnel subjected to a reduced absolute pressure of about 6 inches of Hg. The magnesium hydroxide cake was water-washed on the funnel to provide a cake free of mother liquor.

*Run II.*—A second study was carried out in accordance with said procedure and using the same reactants and concentrations as set forth in run I except that the amount of MgCl₂ brine introduced into the slaker and the precipitator were varied as shown in the table.

*Comparative run* (not in accordance with the present invention).—In comparative run A, brine equal to the total requisite amount was added directly to the precipitator in accordance with the teaching of U.S. Patent No. 3,080,215 instead of adding part of the brine to the slaker and part to the precipitator, as in runs I and II.

The slaking and precipitating conditions and the more important characteristics of the precipitated products produced as shown in the table.

An examination of the results of the comparative run A and runs I and II of Example I of the table illustrates the superiority of the instant improved process over the process employed heretofore for making Mg(OH)₂ product suitable for use in the manufacture of high density, low porosity periclase. The average particle size of the Mg(OH)₂ product produced by the improved process was about 50 percent smaller than the particle size of $Mg(OH)_2$ produced by the patented process. The surface area of the product of the improved process was about 100 percent greater than that produced in the patented process. Further, the resulting periclase made from the small particle size, high surface area $Mg(OH)_2$ product of the instant process was about 5 percent more dense than the periclase manufactured from the $Mg(OH)_2$ product produced by the conventional process.

*Example II*

The procedure of Example I was essentially repeated as run III using equivalent raw materials and similar conditions, except that larger sized equipment and correspondingly higher feed rates were employed, and a 10 percent (by weight) brine addition to the slaker. The results are consistent with Example I and show that when 10 percent of the requisite $MgCl_2$ brine was added to the dolime slaker, there was an increase in product surface area and a decrease in the average particle size. Acceptable periclase densities would be obtained from the $Mg(OH)_2$ product comparable to those of Example I. Comparative run B carried out in accordance with U.S. Patent 3,080,215 is provided for purposes of comparison to illustrate the improvement of the present invention.

*Example III*

This example illustrates the slaking of unpulverized dolime with lower specific gravity aqueous calcium chloride-containing brine slaking solutions and a low percentage of the requisite $MgCl_2$ in the slaker in accordance with the present invention. The slaking vessel in this case consisted of a continuously operated, horizontally disposed, rotating cylindrical slaker with baffles or lifter blades attached to the internal walls of the slaker (as described in U.S. Paent 3,080,215). The dolime, water, recycled precipitator slurry, and 5.1 percent of the requisite $MgCl_2$ brine were continually fed to the slaker. Substantially all the slaking took place at about a specific gravity of about 1.109. Accordingly, sufficient water was added to the slaker along with the precipitator slurry as slaking solution to essentially provide the dolime slurry filtrate specific gravity indicated.

While the dolime analyses of the present Example III was essentially the same as in Example I, the $MgCl_2$ brine contained about 9.4 percent $MgCl_2$ by weight. Comparative run C is provided for purposes of comparison with run IV of the example and was carried out in accordance with U.S. Patent No. 3,080,215.

It can be seen from the data in the table for Example III, run IV, that adding only 5.1 percent of the requisite $MgCl_2$ brine in accordance with the present invention produces a very significant decrease in the average $Mg(OH)_2$ particle size, and a very significant increase in $Mg(OH)_2$ surface areas. Acceptable periclase densities would be obtained from this $Mg(OH)_2$ product comparable to densities obtained in Example I.

*Example IV*

In this example, similar raw materials and the conditions of Example III were employed. Unground dolime, recycled precipitator slurry, and water as the slaking liquid were fed continuously to the rotating slaker along with 2 percent (run V) and 3.8 percent (run VI) of the requisite $MgCl_2$ brine. The remainder of brine in each case was added to the precipitator. The particular slaking and precipitation conditions are shown in the table along with the surface area and average $Mg(OH)_2$ particle size data. Similarly, as in Example III, precipitator slurry and water were added to the slaker to provide a specific gravity of dolime slurry filtrate of about 1.085, at which essentially all the slaking was accomplished. For purposes of comparison, comparative run D is provided as carried out using the method of U.S. Patent 3,080,215. In comparing run D with runs V and VI, it can be seen that an outstanding increase in surface area and decrease in $MG(OH)_2$ particle size was obtained in accordance with the present improvement when surprisingly as little as 2 percent of the requisite $MgCl_2$ brine was added to the slaker.

In a manner similar to the foregoing, high density, high surface area $Mg(OH)_2$ product is produced by the improved process by which a portion of the total weight of brine ordinarily added to the reaction vessel (i.e., from about 1.5 to about 80 weight percent) is first added to the already slaked dolime in a mixing vessel. The remainder of the process is carried out in accordance with the process described in U.S. Patent 3,080,215. The resulting $Mg(OH)_2$ product is suitable for use in making high density, low porosity periclase.

TABLE

| | Example I | | | Example II | | Example III | | Example IV | | |
|---|---|---|---|---|---|---|---|---|---|---|
| | Comparative Run A | Working Runs | | Comparative Run B | Working Run III | Comparative Run C | Working Run IV | Comparative Run D | Working Runs | |
| | | I | I | | | | | | V | VI |
| Dolomitic Lime Slaker Operation: | | | | | | | | | | |
| Lbs./hr. of dolime | 18.25 | 17.5 | 18.4 | | | | | | | |
| Gal./hr. of slaking liquid | 21.4 | 10.5 | None | | | | | | | |
| Gal./hr. of $MgCl_2$ brine | None | 10.5 | 21.4 | | | | | | | |
| Percent of total requisite $MgCl_2$ brine flow | 0 | 21.8 | 27.6 | 0 | 10 | 0 | 5.1 | 0 | 2 | 3.8 |
| °C | 76 | 75 | 71 | 77 | 72 | 85 | 85 | 83 | 80 | 77 |
| Inventory time (minutes) | 6.5 | 6.5 | 6.5 | 4–5 | 4–5 | 11 | 11 | 15 | 10 | 11 |
| Sp. Gr. of dolime slurry filtrate | 1.225 | 1.227 | 1.235 | 1.21 | 1.22 | 1.106 | 1.109 | 1.09 | 1.085 | 1.085 |
| Precipitator Operation: | | | | | | | | | | |
| Gal./hr. of brine (remainder) | 46.5 | 37.5 | 23.6 | | | | | | | |
| Percent of $MgCl_2$ brine flow into precipitator | 100 | 78.2 | 52.4 | 100 | 90 | 100 | 94.9 | 100 | 98 | 96.2 |
| Filtrate sp. gr | 1.245 | 1.245 | 1.241 | 1.235 | 1.233 | 1.236 | 1.236 | 1.237 | 1.228 | 1.228 |
| °C | 63 | 63 | 63 | 65 | 65 | 65 | 65 | 58 | 66 | 65 |
| Inventory time (hours) | 3.8 | 3.9 | 3.8 | 4.6 | 4.6 | 6.5 | 6.5 | 10 | 7 | 9 |
| $Mg(OH)_2$ Product Analysis: | | | | | | | | | | |
| Average $Mg(OH)_2$ particle size (microns) | 7.2 | 4.8 | 3.7 | 7.9 | 5.5 | 6.2 | 3.6 | 5.8 | 4.6 | 3.8 |
| Dry $Mg(OH)_2$ surface area (m.$^2$/gm.) | 7.9 | 13.2 | 18.7 | 7.8 | 9.8 | 6.5 | 11.7 | 9.2 | 12.3 | 15.2 |
| Resulting Periclase: Density (gm./cc.) | 2.953 | 3.12 | 3.12 | 2.945 | | | | | | |

Various modifications may be made in the instant invention without departing from the spirit or scope thereof, for it is to be understood that we limit ourselves only as defined in the appended claims.

What is claimed is:

1. In a process for producing magnesium hydroxide which will provide a filter cake of high density and high purity by calcining dolomite to produce dolime, slaking the dolime at a temperature of between 40° and 90° C. for at least about 4 minutes with a slaking liquid comprising an aqueous $CaCl_2$ solution substantially free of magnesium ions, the liquid portion thereof having a specific gravity of at least 1.07, thereby the produce a slaked dolime slurry, and intermixing the dolime slurry so produced with an aqueous brine solution containing at least about 2 percent by weight of $MgCl_2$ for a mixing period of at least about 2 hours at a temperature of within the range of from about 40° C. and about 80° C., the amount of the dolime slurry being sufficient to provide more than one mole of $Ca(OH)_2$ per mole of $MgCl_2$ thereby to produce solid magnesium hydroxide suspended in a $CaCl_2$-containing brine, and recovering the thus-produced magnesium hydroxide, the improvement comprising:
  (a) slaking the dolime with a slaking liquid comprising an aqueous calcium chloride solution of a specific gravity in the slaker of from about 1.07 to about 1.3 having in combination therewith from about 1.5 to about 80 weight percent of the requisite $MgCl_2$-containing aqueous brine solution while maintaining a temperature in the brine, dolime and $CaCl_2$ solution within the range of from about 40° to about 90° C. and continuing the slaking process for a period within the range of from about 4 minutes to about 3 hours, the amount of aqueous brine being directly related to specific gravity of the slaking liquid;
  (b) maxing the remainder of said requisite $MgCl_2$-containing aqueous brine solution with the resulting dolime slurry; and
  (c) maintaining the resulting mixture for at least about 2 hours at a temperature within the range of from about 40° to about 80° C.

2. In a process for producing magnesium hydroxide which will provide a filter cake of high density and high purity by calcining dolomite to produce dolime, slaking the dolime at a temperature of between 40° and 90° C. for at least about 4 minutes with a slaking liquid comprising an equeous $CaCl_2$ solution substantially free of magnesium ions and the liquid portion thereof having a specific gravity in the slaker of from about 1.07 to about 1.30, thereby to produce a slaked dolime slurry, and intermixing the dolime slurry so produced with an aqueous brine solution containing at least about 2 percent by weight of $MgCl_2$ for a mixing period of at least about 2 hours at a temperature of within the range of from about 40° and about 80° C., the amount of the dolime slurry being sufficient to provide more than one mole of $Ca(OH)_2$ per mole of $MgCl_2$ thereby to produce solid magnesium hydroxide suspended in a $CaCl_2$-containing brine, and recovering the thus-produced magnesium hydroxide, the improvement comprising:
  (a) introducing into the slaked dolime slurry from about 1.5 to about 80 weight percent of said requisite $MgCl_2$-containing aqueous brine solution while maintaining a temperature within the range of from 40° to about 90° C. for a period within the range of from about 4 minutes to about 3 hours;
  (b) adding to the resulting reaction mixture of said $MgCl_2$-containing brine and dolime slurry, the remainder of said requisite $MgCl_2$-containing aqueous brine solution; and
  (c) maintaining this mixture at least for about 2 hours at a temperature within the range of from about 40° to about 80° C.

References Cited
UNITED STATES PATENTS

| | | | |
|---|---|---|---|
| 2,893,840 | 7/1959 | Vettel et al. | 23—201 |
| 3,080,215 | 3/1963 | Waldron et al. | 23—201 |
| 3,294,485 | 12/1966 | Mayer | 23—201 X |

MILTON WEISSMAN, *Primary Examiner.*

OSCAR R. VERTIZ, *Examiner.*

G. T. OZAKI, *Assistant Examiner.*